(12) United States Patent
Ho et al.

(10) Patent No.: US 11,926,422 B2
(45) Date of Patent: Mar. 12, 2024

(54) 100% AMBIENT AIR ENVIRONMENTAL CONTROL SYSTEM WITH BLEED TURBINE IN SERIES

(71) Applicant: Hamilton Sundstrand Corporation, Charlotte, NC (US)

(72) Inventors: Tony Ho, Glastonbury, CT (US); Louis J. Bruno, Ellington, CT (US); Aiden Coutin, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 93 days.

(21) Appl. No.: 17/465,374

(22) Filed: Sep. 2, 2021

(65) Prior Publication Data

US 2022/0348334 A1 Nov. 3, 2022

Related U.S. Application Data

(60) Provisional application No. 63/181,647, filed on Apr. 29, 2021.

(51) Int. Cl.
*B64D 13/06* (2006.01)

(52) U.S. Cl.
CPC ...... *B64D 13/06* (2013.01); *B64D 2013/0611* (2013.01); *B64D 2013/0618* (2013.01); *B64D 2013/0648* (2013.01)

(58) Field of Classification Search
CPC .... B64D 2013/0611; B64D 2013/0618; B64D 2013/0648; B64D 13/06
See application file for complete search history.

(56) References Cited

U.S. PATENT DOCUMENTS

| | | |
|---|---|---|
| 10,059,457 B2 | 8/2018 | Klimipel et al. |
| 10,202,197 B2 | 2/2019 | Bammann et al. |
| 10,953,992 B2 | 3/2021 | Bruno et al. |

(Continued)

FOREIGN PATENT DOCUMENTS

| | | |
|---|---|---|
| EP | 1386837 A1 | 2/2004 |
| EP | 2998223 A1 | 3/2016 |

(Continued)

OTHER PUBLICATIONS

European Search Report; European Application No. 22170995.9; dated Sep. 15, 2022; 9 pages.

*Primary Examiner* — Gordon A Jones
(74) *Attorney, Agent, or Firm* — CANTOR COLBURN LLP

(57) ABSTRACT

An environmental control system of a vehicle includes a first compression device including a compressor, a first turbine, and a power turbine operably coupled by a shaft. The first turbine is configured to receive a first medium, the compressor is configured to receive a second medium, and the power turbine is configured to receive a third medium. A second compression device, separate from the first compression device, includes a second turbine. The environmental control system is operable in a first mode and a second mode. In the first mode, the second medium is provided to the compressor and the second turbine sequentially. In the second mode, the second medium bypasses the second turbine. In in both the first mode and the second mode, only the second medium is provided to an outlet of the environmental control system.

15 Claims, 3 Drawing Sheets

(56) References Cited

U.S. PATENT DOCUMENTS

| | | | |
|---|---|---|---|
| 10,967,978 B2 | 4/2021 | Bammann et al. | |
| 2019/0135440 A1 | 5/2019 | Bruno et al. | |
| 2020/0130849 A1* | 4/2020 | Hennig | B64D 13/06 |
| 2021/0070453 A1 | 3/2021 | Kocherry et al. | |
| 2022/0145809 A1* | 5/2022 | Hallisey | F02C 9/18 |

FOREIGN PATENT DOCUMENTS

| | | |
|---|---|---|
| EP | 3514065 A1 | 7/2019 |
| JP | 2001328596 A | 11/2001 |

* cited by examiner

100% AMBIENT AIR ENVIRONMENTAL CONTROL SYSTEM WITH BLEED TURBINE IN SERIES

CROSS REFERENCE TO RELATED APPLICATIONS

This application claims the benefit of U.S. Provisional Application No. 63/181,647 filed Apr. 29, 2021, the disclosure of which is incorporated herein by reference in its entirety.

BACKGROUND

Exemplary embodiments pertain to the art of environmental control systems, and more particularly, to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

SUMMARY

According to an embodiment, an environmental control system of a vehicle includes a first compression device including a compressor, a first turbine, and a power turbine operably coupled by a shaft. The first turbine is configured to receive a first medium, the compressor is configured to receive a second medium, and the power turbine is configured to receive a third medium. A second compression device, separate from the first compression device, includes a second turbine. The environmental control system is operable in a first mode and a second mode. In the first mode, the second medium is provided to the compressor and the second turbine sequentially. In the second mode, the second medium bypasses the second turbine. In in both the first mode and the second mode, only the second medium is provided to an outlet of the environmental control system.

In addition to one or more of the features described above, or as an alternative to any of the foregoing embodiments the first medium is bleed air and the second medium is outside air.

In addition to one or more of the features described above, or as an alternative to any of the foregoing embodiments the second compression device is a two-wheel air cycle machine.

In addition to one or more of the features described above, or as an alternative to any of the foregoing embodiments comprising a ram air circuit having a ram air shell, wherein in both the first mode and the second mode, the first medium provided at an outlet of the first compression device is exhausted into the ram air shell.

In addition to one or more of the features described above, or as an alternative to any of the foregoing embodiments the second compression device includes a fan operably coupled to the second turbine via another shaft, the fan being arranged in fluid communication with a portion of the ram air circuit.

In addition to one or more of the features described above, or as an alternative to any of the foregoing embodiments the third medium output from the first compression device is exhausted into the ram air shell.

In addition to one or more of the features described above, or as an alternative to any of the foregoing embodiments the third medium output from the first compression device is mixed with the first medium before being exhausted into the ram air shell.

In addition to one or more of the features described above, or as an alternative to any of the foregoing embodiments during operation in one of the plurality of modes, work is extracted from both the first medium and the third medium in the first compression device to drive the compressor.

In addition to one or more of the features described above, or as an alternative to any of the foregoing embodiments the first compression device further comprises a third turbine, configured to receive the first medium.

In addition to one or more of the features described above, or as an alternative to any of the foregoing embodiments during operation in the first mode, the first medium is provided to the first turbine and the third turbine in series.

In addition to one or more of the features described above, or as an alternative to any of the foregoing embodiments during operation in the first mode, the first medium is provided to the first turbine and the third turbine in parallel.

In addition to one or more of the features described above, or as an alternative to any of the foregoing embodiments during operation in the second mode, the first medium is configured to bypass one of the first turbine and the third turbine.

In addition to one or more of the features described above, or as an alternative to any of the foregoing embodiments the ram air circuit further comprises a primary heat exchanger and a secondary heat exchanger arranged within the ram air shell and a divider extending parallel to a flow through the ram air circuit, the divider being positioned to form a first portion and a second portion of the primary heat exchanger and the secondary heat exchanger, respectively.

In addition to one or more of the features described above, or as an alternative to any of the foregoing embodiments the first medium provided at the outlet of the first compression device is exhausted into the ram air shell in fluid communication with the first portion of the primary heat exchanger and the secondary heat exchanger.

In addition to one or more of the features described above, or as an alternative to any of the foregoing embodiments a flow of ram air is arranged in fluid communication with the second portion of the primary heat exchanger and the secondary heat exchanger.

In addition to one or more of the features described above, or as an alternative to any of the foregoing embodiments the first mode is a low altitude mode.

In addition to one or more of the features described above, or as an alternative to any of the foregoing embodiments the first mode is a high altitude mode.

According to an embodiment, a method of operating an environmental control system of a vehicle includes expanding a first medium within a first turbine of a first compression device, and exhausting the first medium into a ram air circuit, the first turbine being operably coupled to a compressor and a power turbine by a shaft, compressing a second medium within the compressor, expanding the second medium within a second turbine of a second compression device, distinct from the first compression device, during operation in a first mode, and bypassing the second turbine with the second medium and providing a third medium to the power turbine during operation in a second mode. In both the first mode and the second mode, delivering a conditioned form of the second medium to an outlet of the environmental control system.

In addition to one or more of the features described above, or as an alternative to any of the foregoing embodiments the second medium is outside air.

In addition to one or more of the features described above, or as an alternative to any of the foregoing embodiments during operation in the second mode, mixing the first medium and the third medium output from the first compression device, and exhausting the mixed first medium and third medium into the ram air circuit.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
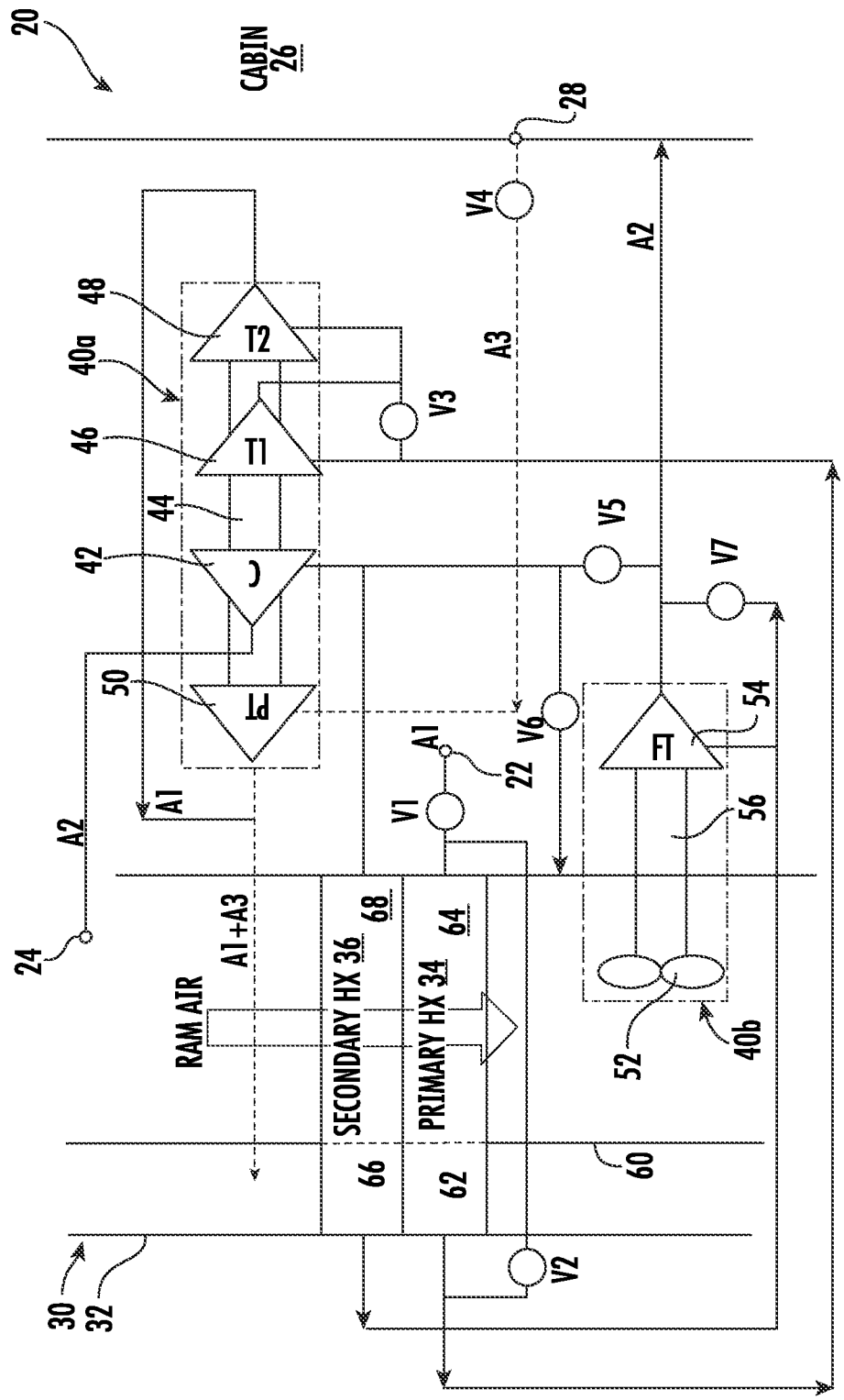
FIG. 1 is a schematic diagram of an environmental control system according to an embodiment.

A detailed description of one or more embodiments of the disclosed apparatus and method are presented herein by way of exemplification and not limitation with reference to the Figures.

Embodiments herein provide an environmental control system of an aircraft that uses mediums from different sources to power the environmental control system and to provide cabin pressurization and cooling at a high fuel burn efficiency. The medium can generally be air, while other examples include gases, liquids, fluidized solids, or slurries.

With reference now to the FIGS., various schematic diagrams of a portion of an environment control system (ECS) 20, such as an air conditioning unit or pack for example, is depicted according to non-limiting embodiments. Although the environmental control system 20 is described with reference to an aircraft, alternative applications, such as another vehicle for example, are also within the scope of the disclosure. As shown in the figures, the system 20 can receive a first medium A1 at a first inlet 22. In embodiments where the environmental control system 20 is used in an aircraft application, the first medium A1 is bleed air, which is pressurized air originating from, i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 is also configured to receive a second medium A2 at a second inlet 24 and may provide a conditioned form of the second medium A2 to a volume 26 during normal operation. In an embodiment, the second medium A2 is fresh air, such as outside air for example. The outside air can be procured via one or more scooping mechanisms, such as an impact scoop or a flush scoop for example. Thus, the second inlet 24 can be considered a fresh or outside air inlet. In an embodiment, the second medium A2 is ram air drawn from a portion of a ram air circuit to be described in more detail below. Generally, the second medium A2 described herein is at an ambient pressure equal to an air pressure outside of the aircraft when the aircraft is on the ground and is between an ambient pressure and a cabin pressure when the aircraft is in flight.

The system 20 can further receive a third medium A3 at a third inlet 28. In one embodiment, the second inlet 24 is operably coupled to a volume 26, such as the cabin of an aircraft, and the third medium A3 is cabin discharge air, which is air leaving the volume and that would typically be discharged overboard. In some embodiments, the system 20 is configured to extract work from the third medium A3. In this manner, the pressurized air A3 of the volume 26 can be utilized by the system 20 to achieve certain operations.

As shown, the environmental control system 20 may include a ram air circuit 30 including a shell or duct 32 within which one or more heat exchangers are located. The ram air duct 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the ram air duct 32 may be referred to as ram heat exchangers. In the illustrated, non-limiting embodiment, the ram heat exchangers include a first or primary heat exchanger 34 and a second or secondary heat exchanger 36. Within the heat exchangers 34, 36, ram air, such as outside air for example, acts as a heat sink to cool a medium passing there through, for example the first medium A1 and/or the second medium A2. Although a ram air circuit 30 having only two heat exchangers 34, 36 is illustrated, it should be understood that embodiments having only a single heat exchanger, or alternatively, more than two heat exchangers are also contemplated herein.

The system 20 additionally includes at least one compression device, and in some embodiments includes a plurality of compression devices. Each compression device is a mechanical device that includes components for performing thermodynamic work on a medium (e.g., extracts work from or applies work to the first medium A1, the second medium A2 by raising and/or lowering pressure and by raising and/or lowering temperature). Examples of a compression device include an air cycle machine, a two-wheel air cycle machine, a three-wheel air cycle machine, a four-wheel air cycle machine, etc.

In the illustrated, non-limiting embodiment, the system 20 includes a first compression device 40a and a second compression device 40b. The first and second compression device 40a, 40b are arranged in series relative to a flow of the second medium A2 during at least one mode of operation of the system 20. The first compression device 40a may include a compressor 42 and at least one turbine operably coupled by a shaft 44. In an embodiment, best shown in FIGS. 1 and 2, the first compression device 40a includes three turbines 46, 48, 50. In such embodiments, the first medium A1 may be configured to flow through two of the turbines in series (FIG. 1), or alternatively, in parallel (FIG. 2). In another embodiment, the first compression device 40a includes two turbines 46, 50.

A compressor 42 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc.

A turbine, such as any of turbines 46, 48, and 50 for example, is a mechanical device that expand a medium and extract work therefrom (also referred to as extracting energy) to drive the compressor 42 via the shaft 44.

In an embodiment, the second compression device 40b is a simple cycle or two-wheel machine. As shown, the second compression device 40b has only a fan 52 and a turbine 54 operably coupled by a shaft 56. A fan 52 is a mechanical device that can force via push or pull methods air through the shell of the ram air duct, across at least a portion of the ram air heat exchangers. However, embodiments where the fan 52 is a component separate from a compression device and driven by any suitable means are also contemplated herein. In an embodiment, as will be described in more detail below, the second medium A2 is only provided to the turbine 54 of the second compression device 40b when the aircraft is in a certain mode of operation, such as when the aircraft is on the ground for example.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 may be configured to control a supply of the first medium A1 to the system 20, and a fourth valve V4 may be configured to control a supply of the third medium A3 to the system 20. A second valve V2, may be operable to allow a portion of a medium, such as the first medium A1, to bypass the ram air circuit 30. As a result, operation of the second valve V2 may be used to add heat to the system 20 and to drive the first compression device 40a when needed. Valve V3 is arranged at the interface between the first and second turbines 46, 48 of the first compression device 40a. Accordingly, valve V3 may be used to control the amount of energy extracted from the first medium by providing the flow to the turbines 46, 48 in series or in parallel.

Operation of a fifth valve V5 located downstream from the compressor 42 may be used to allow a portion of the second medium A2 to bypass the remainder of the system 20. Accordingly, flow from the fifth valve is provided to an outlet of the system 20. In an embodiment, a sixth valve V6 is a surge control valve, operable to exhaust a portion of the second medium A2 output from the compressor 42 overboard or into the ram air circuit 30 to prevent a compressor surge. In an embodiment, a seventh valve V7 is operable to allow a supply of a medium, such as the second medium A2 for example, to bypass the turbine 54 of the second compression device 40b.

Figure 2:
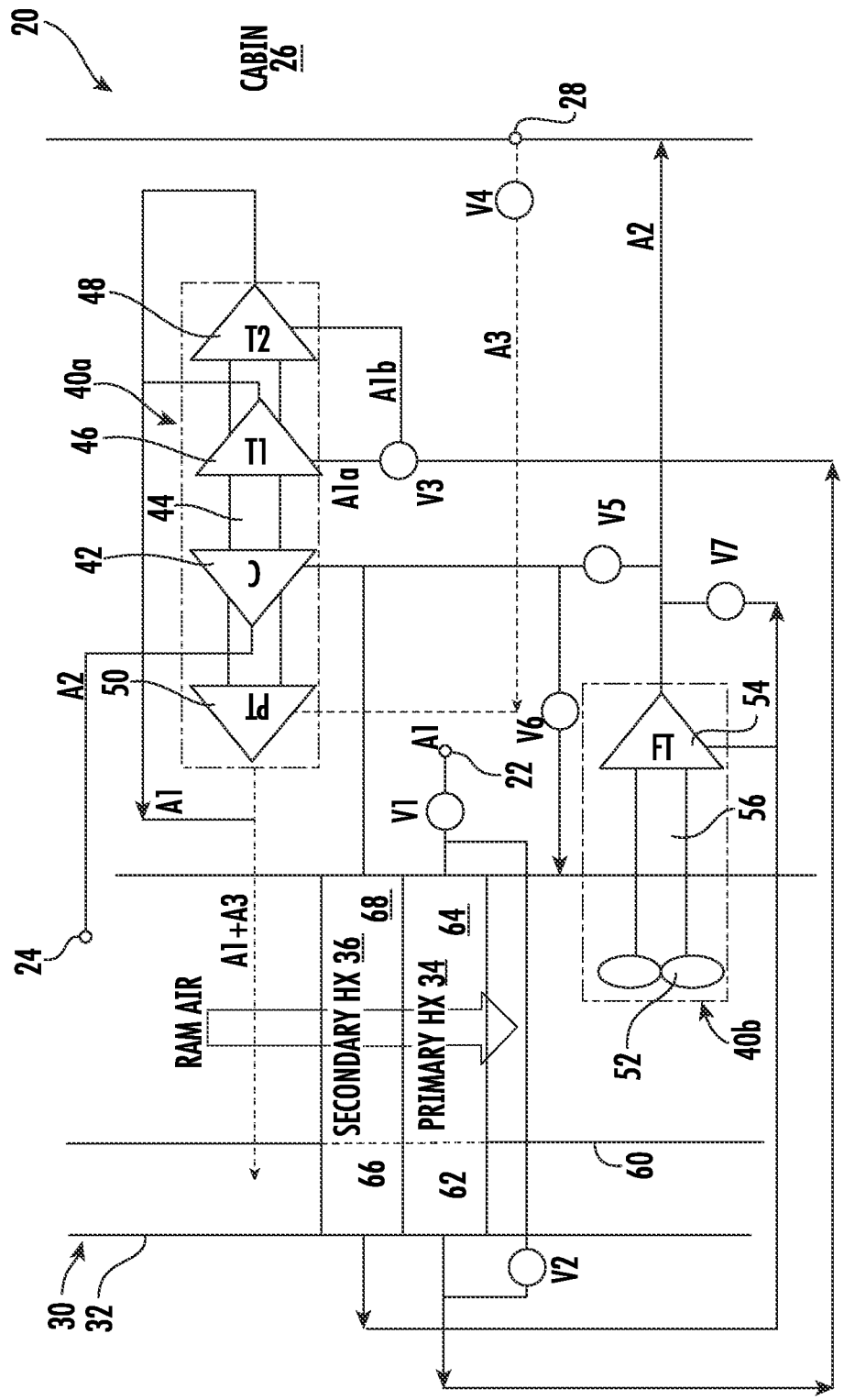
FIG. 2 is a schematic diagram of an environmental control system according to another embodiment.
Figure 3:
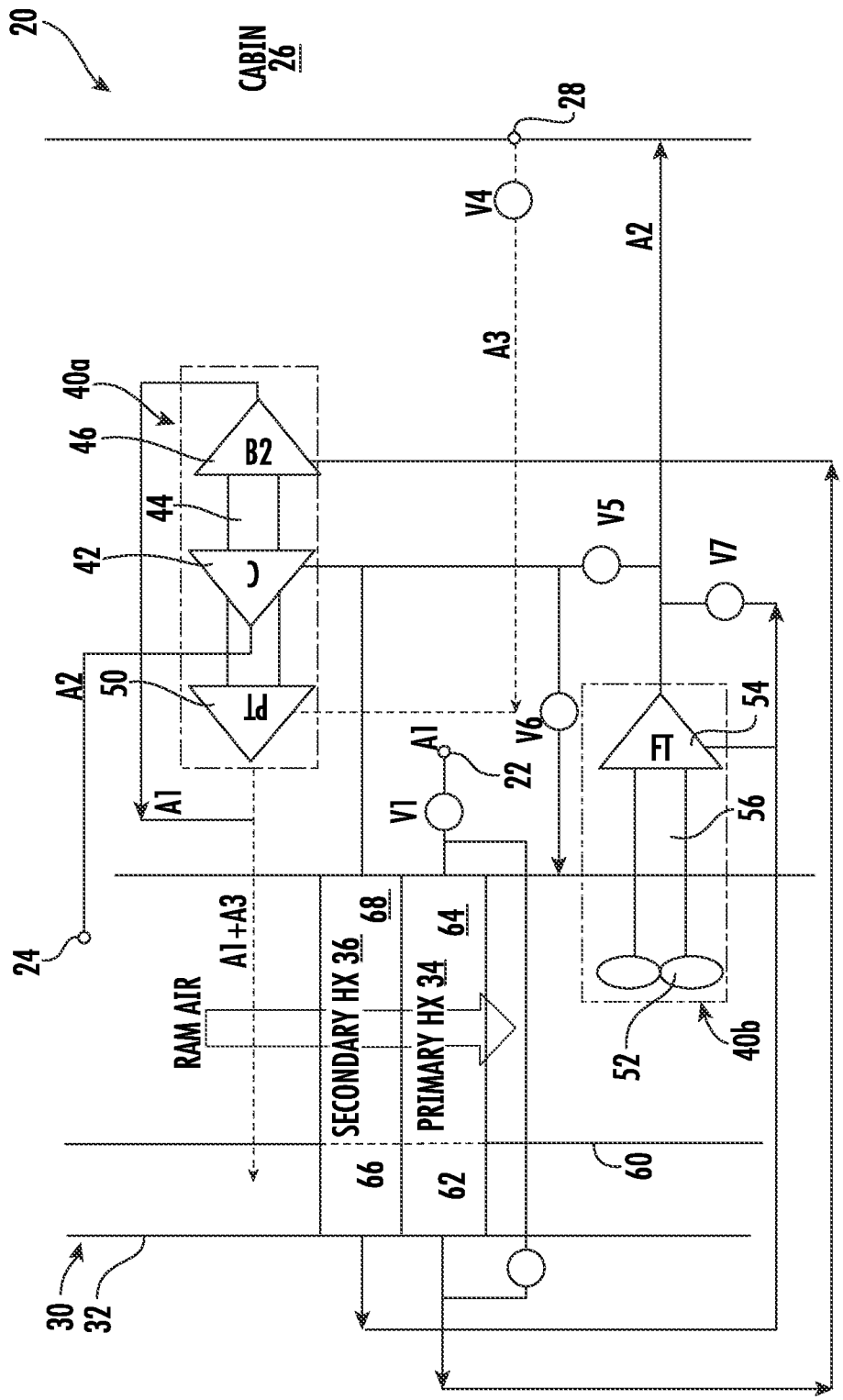
FIG. 3 is a schematic diagram of an environmental control system according to yet another embodiment.

With continued reference to each of the systems of FIGS. 1-3, the system 20 is operable in a plurality of modes, selectable based on a flight condition of the aircraft. For example, the system 20 may be operable in a first, low altitude mode or a second, high altitude mode. The first, low altitude mode is typically used for ground and low altitude flight conditions, such as ground idle, taxi, take-off, and hold conditions, and the second, high altitude mode may be used at high altitude cruise, climb, and descent flight conditions.

With reference to FIG. 1, in the first, low altitude mode, valve V1 is open, and a high pressure first medium A1, such as bleed air drawn from an engine or APU, is provided to the primary heat exchanger 34. As shown, the primary heat exchanger 34 may be separated by a divider 60 into a first portion 62 and a second portion 64, respectively. In the illustrated, non-limiting embodiment, the first medium A1 is provided to the second portion 64 and the first portion 62 of the primary heat exchanger 34 in series. However, it should be understood that in other embodiments, the first portion 62 may be located upstream from the second portion relative to the flow of the first medium A1. In the first, low altitude mode, the second portion 64 of the primary heat exchanger 34, the first medium A1 is cooled via a flow of ram air, driven through the ram air duct on one side of the divider 60 by the fan 52 of the second compression device 40b. In the first portion 62 of the primary heat exchanger 34, the first medium A1 is cooled by a flow of the first medium A1 output from the first compression device 40a, to be described in more detail below.

In an embodiment, a nozzle of each of the first turbine 46 and second turbine 48 may be sized based on a mode of operation of the ECS 20. For example, the nozzle of the first turbine 46 may be sized to use all of the available pressure of the first medium A1 provided thereto when valve V1 is fully open and the aircraft is at altitude. The nozzle of the second turbine 48 may be sized to use all of the available pressure of the first medium provided thereto when valve V1 is fully open and the aircraft is on the ground. Accordingly, in an embodiment, the nozzle of the first turbine 46 is smaller than the nozzle of the second turbine 48.

During operation in the first low altitude mode, valve V3 is open, such that the cool first medium A1 output from the heat exchanger 34 is configured to bypass the first turbine 46, and instead is provided directly to the second turbine 48 of the first compression device 40a, provided to the inlet of the first turbine 46. Within the second turbine 48, the high pressure first medium A1 is expanded and work is extracted therefrom. The first medium A1 output from the second turbine 48 has a reduced temperature and pressure relative to the first medium A1 provided to the inlet of the second turbine 46.

The first medium A1 output from the second turbine 48 of the first compression device 40a is then provided to the ram air circuit 30. In the illustrated, non-limiting embodiment, this cooled flow of the first medium A1 output from the first compression device 40a is exhausted into the ram air duct 32 on an opposite side of the divider 60 as the ram air such that the ram air and the first medium A1 do not mix. This first medium A1 within the ram air duct 32 is used to cool the flow of first medium A1 within the first portion 62 of the primary heat exchanger 34 before being exhausted overboard.

The work extracted from the first medium A1 in the second turbine 48 drives the compressor 42, which is used to compress a second medium A2 provided from the second inlet 24. As shown, the second medium A2, such as fresh air for example, may be drawn from an upstream end of the ram air circuit 30 or from another source and provided to an inlet of the compressor 42. The act of compressing the second medium A2, heats the second medium A2 and increases the pressure of the second medium A2.

In the illustrated, non-limiting embodiment, when valves V5 and V6 are closed, the second medium A2 is configured to flow from an outlet of the compressor 42 to the secondary heat exchanger 36. As shown, the secondary heat exchanger 36 may also be separated by the divider 60 into a first portion 66 and a second portion 68, respectively. In the illustrated, non-limiting embodiment, the second medium A2 is provided to the second portion 68 and the first portion 66 of the secondary heat exchanger 36 in series. However, embodiments where the first portion 66 is arranged upstream from the second portion 68 relative to the flow of the second medium A2 are also contemplated herein. In the first, low altitude mode, the second medium A2 within the second portion 68 of the secondary heat exchanger 36 is cooled by a flow of ram air, driven by the fan 52 of the second compression device 40b. As shown, the second portion 68 of the secondary heat exchanger 36 is arranged upstream from the second portion 64 of the primary heat exchanger 34 relative to the flow of ram air through the ram air duct 32. The cooler second medium A2 is then provided to the first portion 66 of the secondary heat exchanger 36 where the flow is further cooled by the flow of first medium A1 output from the first compression device 40a. The first portion 66 of the secondary heat exchanger 36 is arranged upstream from the first portion 62 of the primary heat exchanger 34 relative to the flow of the first medium A1 output from the first compression device 40a to the ram air duct 32. It should be noted that the divider 60 may extend beyond the heat exchangers such that the flow of ram air and the flow of the first medium A1 output from the first compression device 40a remain generally separate over the length of the ram air duct. However, in other embodiments, the ram air and the flow of the first medium A1 output from the first compression device 40a may be configured to mix at a location downstream from the ram air heat exchangers.

From the secondary heat exchanger 36, the second medium A2 is provided to the turbine 54 of the second compression device 40b. Within the turbine, the second medium A2 is expanded and work is extracted therefrom. As shown, the work extracted from the turbine 54 may be used to drive rotation of the fan 52 via the shaft 56. The cooler, lower pressure medium A2 output from the turbine 54 may then provided to one or more loads, such as to the cabin for example, via an outlet of the system. In the low altitude mode of operation, the third medium A3 is not provided to the environmental control system 20.

With continued reference to FIG. 1, the high-altitude mode of operation is similar to the low altitude mode of operation. However, in some embodiments, valve V2 may be open to allow at least a portion of the first medium A1 to bypass the primary heat exchanger 34. Valve V2 may be operated to control, and in some embodiments, maximize the temperature of the first medium A1 provided to the first compression device 40a. As a result, the work extracted from the first medium A1 within at least one turbine 46, 48 of the first compression device 40a may be optimized while exhausting the first medium A1 therefrom with a temperature suitable to function as a heat sink with respect to the first portion 66, 62 of the primary and secondary heat exchangers 34, 36.

Further, in the high altitude mode of operation, the first medium A1 is provided to the first turbine 46 and the second turbine 48 in series. In each of these turbines 46, 48, the first medium A1 is expanded and work is extracted therefrom to drive the compressor 42. The first medium A1 provided at the outlet of the second turbine 48 is then dumped into a portion of the ram air circuit 30.

The flow of the second medium A2 may be similar in both the low altitude mode and the high altitude mode. However, in an embodiment, in the second, high altitude mode of operation, valve V7 is open such that the second medium A2 bypasses the turbine 54 of the second compression devices 40b. In such embodiments, the second medium A2 as conditioned at the outlet of the secondary heat exchanger 36 is provided to the one or more loads of the aircraft, such as the cabin 26 for example. Further, because the second medium A2 bypasses the turbine 54 of the second compression device 40b, rotation of the fan 52 is not driven by the turbine 54 in the high altitude mode. However, the pressure differential between the ram air drawn in, such as via a scoop for example, and an opposite end of the ram air circuit 30 may be sufficient to move air through the ram air circuit 30 without use of the fan 25.

In an embodiment, in the high-altitude mode of operation, the third medium A3, such as an exhaust of cabin air for example, is recirculated to the system 20 from the pressurized volume or cabin 26, via the third inlet 28. The flow of the third medium A3 may be provided directly to an inlet of the power turbine 50 of the first compression device 40a. The additional work extracted from the third medium A3 within the power turbine 50 is used in combination with the work extracted from the first medium A1 in another turbine of the first compression device 40a to drive the compressor 42.

As shown, the third medium A3 may be mixed at a mixing point with the first medium A1 upstream from the ram air circuit 30. In the illustrated, non-limiting embodiment, the mixing point is located downstream from an outlet of the first turbine 46, the second turbine 48 and the power turbine 50. In the high altitude mode of operation, this mixture of first medium A1 and third medium A3 may be used to cool the second medium A2 within the first portion 66 of the secondary heat exchanger 36, and/or to cool the first medium A1 within the first portion 62 of the primary heat exchanger 34, before being dumped or exhausted overboard.

Operation of the ECS 20 illustrated in FIG. 2 is similar to the ECS 20 of FIG. 1. However, the first turbine 46 and the second turbine 48 illustrated in FIG. 2 are arranged in parallel. In such embodiments, the nozzle of the first turbine 46 and the second turbine 48 may be sized, in combination, to use all of the available pressure of the first medium A1 provided thereto when valve V1 is fully open and the aircraft is on the ground. Accordingly, when the aircraft is in the first, low altitude mode of operation, a first portion of the flow of the first medium A1 output from the primary heat exchanger 34 may be provided to the first turbine 46 and a second portion A1b of the first medium A1 may be provided to the second turbine 48 in parallel. Accordingly, work is extracted from both flows of the first medium A1 simultaneously. The two separate flows A1a, A1b of the first medium A1 provided to turbine 46 and turbine 48, respectively, are then rejoined downstream from the first compression device 40a. In the high altitude mode of operation, the first medium A1 may be provided to the first turbine 46, the second turbine 48, or both the first and second turbine 48. A controller of the system may be operable to determine a position of the valve V3 to control the flow of the first medium A1 based on one or more operational characteristics of the ECS 20.

With continued reference to FIG. 2, in yet another embodiment, the nozzle of each of the first turbine 46 and second turbine 48 may be sized based on a specific mode of operation of the ECS 20. For example, the nozzle of the first turbine 46 may be sized to use all of the available pressure of the first medium A1 provided thereto when valve V1 is fully open and the aircraft is at altitude. Similarly, the nozzle of the second turbine 48 may be sized to use all of the available pressure of the first medium provided thereto when valve V1 is fully open and the aircraft is on the ground. Accordingly, in the low altitude mode of operation, valve V3 may be positioned to direct the entire flow of first medium A1 to the second turbine 48 and in the high altitude mode of operation, valve V3 may be positioned to direct the entire flow of first medium A1 to the first turbine 46. Operation of the system of FIG. 2 may be otherwise identical to that described above with respect to FIG. 1.

Operation of the system 20 illustrated in FIG. 3 is similar to the environmental control system 20 of FIGS. 1 and 2. However, in the embodiment of FIG. 3, the first compression device 40a only includes the first turbine 46 and the power turbine 50. Accordingly, in both the high and low altitude modes of operation, the flow of the first medium A1, regardless of whether the first medium A1 bypasses or flows through the primary heat exchanger 34, is provided to first turbine 46. In the low altitude mode, the first medium A1 output from the first turbine 46 is configured to cool the first and second mediums A1, A2 within the first portions 62, 66 of the heat exchangers 34, 36. The first medium A1 is also provided to the first turbine 46 in the high altitude mode of operation. In the high altitude mode, the flow of first medium A1 output from the first turbine 46 is mixed with the flow of the third medium A3 output from the power turbine 50 as previously described, before passing over the first portion of the ram air heat exchangers 34, 36.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of a vehicle comprising:
   a first compression device including a compressor, a first turbine, a power turbine, and a third turbine operably coupled by a shaft, wherein the first turbine and the third medium configured to receive a first medium, the compressor is configured to receive a second medium, and the power turbine is configured to receive a third medium, the first medium, the second medium, and the third medium being distinct; and
   a second compression device, separated from the first compression device, the second compression device including a second turbine;
   a bypass line extending from directly upstream of an inlet of the first turbine to an inlet of the second turbine;
   wherein the environmental control system is operable in a plurality of modes including a first mode and a second mode, in the first mode, the second medium is provided to the compressor and the second turbine sequentially and in the second mode, the second medium bypasses the second turbine, wherein in both the first mode and the second mode, only the second medium is provided to an outlet of the environmental control system;
   wherein in at least one mode of the plurality of modes, the first medium is configured to bypass the first turbine via the bypass line.

2. The environmental control system of claim 1, wherein the first medium is bleed air and the second medium is outside air.

3. The environmental control system of claim 1, wherein the second compression device is a two-wheel air cycle machine.

4. The environmental control system of claim 1, further comprising a ram air circuit having a ram air shell, wherein in both the first mode and the second mode, the first medium provided at an outlet of the first compression device is exhausted into the ram air shell.

5. The environmental control system of claim 4, wherein the second compression device includes a fan operably coupled to the second turbine via another shaft, the fan being arranged in fluid communication with a portion of the ram air circuit.

6. The environmental control system of claim 4, wherein the third medium provided at an outlet of the power turbine is exhausted into the ram air shell.

7. The environmental control system of claim 4, wherein the third medium provided at an outlet of the power turbine is mixed with the first medium before being exhausted into the ram air shell.

8. The environmental control system of claim 4, wherein during operation in one of the plurality of modes, work is extracted from both the first medium and the third medium in the first compression device to drive the compressor.

9. The environmental control system of claim 1, wherein during operation in the first mode, the first medium is provided to the first turbine and the third turbine in series.

10. The environmental control system of claim 1, wherein during operation in the first mode, the first medium is provided to the first turbine and the third turbine in parallel.

11. The environmental control system of claim 4, wherein the ram air circuit further comprises:
    a primary heat exchanger and a secondary heat exchanger arranged within the ram air shell; and
    a divider extending parallel to a flow through the ram air circuit, the divider being positioned to form a first portion and a second portion of the primary heat exchanger and the secondary heat exchanger, respectively.

12. The environmental control system of claim 11, wherein the first medium provided at the outlet of the compressor is exhausted into the ram air shell in fluid communication with the first portion of the primary heat exchanger and the secondary heat exchanger.

13. The environmental control system of claim 11, wherein a flow of ram air is arranged in fluid communication with the second portion of the primary heat exchanger and the secondary heat exchanger.

14. The environmental control system of claim 1, wherein the first mode is a low altitude mode.

15. The environmental control system of claim 1, wherein the first mode is a high altitude mode.

* * * * *